United States Patent [19]

Gyongyossy

[11] Patent Number: 5,370,155

[45] Date of Patent: Dec. 6, 1994

[54] WEDGE-TYPE GATE VALVE

[76] Inventor: Leslie L. Gyongyossy, 11140 Westheimer Rd., #358, Houston, Tex. 77042

[21] Appl. No.: 144,335

[22] Filed: Nov. 1, 1993

[51] Int. Cl.⁵ .............................. F16K 13/12
[52] U.S. Cl. ............................. 137/630.12
[58] Field of Search .......... 137/630.12, 630.15

[56] References Cited

U.S. PATENT DOCUMENTS

| 745,774 | 12/1903 | Brady | 137/630.12 |
|---|---|---|---|
| 1,549,609 | 8/1925 | Redding | 137/630.12 |
| 1,932,471 | 10/1933 | McKellar | 137/630.12 |
| 4,580,603 | 4/1986 | Schoen | 137/630.15 |
| 4,678,008 | 7/1987 | Gyongyossy | 137/630.12 |

FOREIGN PATENT DOCUMENTS

| 564338 | 3/1923 | France . |
|---|---|---|
| 553249 | 6/1932 | Germany . |
| 681510 | 9/1939 | Germany . |
| 2546024 | 4/1977 | Germany . |

Primary Examiner—Robert G. Nilson
Attorney, Agent, or Firm—Kenneth H. Johnson

[57] ABSTRACT

A wedge type gate valve in which a pressure equalizing valve is located in a chamber in the wedge-shaped valve member which is vented to the downstream side of the gate to equalize system pressure prior to opening the valve by using a ball-valve rotationally mounted in chamber. The ball-shaped valve is operated by the stem which operates the gate-valve for limited rotational movement between two stops of a connecting member in such a way that the stem rotational movement is stopped at a predetermined point when the sealed internal ball-shaped valve is fully opened or fully closed, thereby opening or closing the wedge-shaped member pressure equalizing passage. The vent passage which opens from the pressure equalizing valve chamber to the downstream side of the gate also permits the evacuation of fluids from the annular space above the gate.

12 Claims, 4 Drawing Sheets

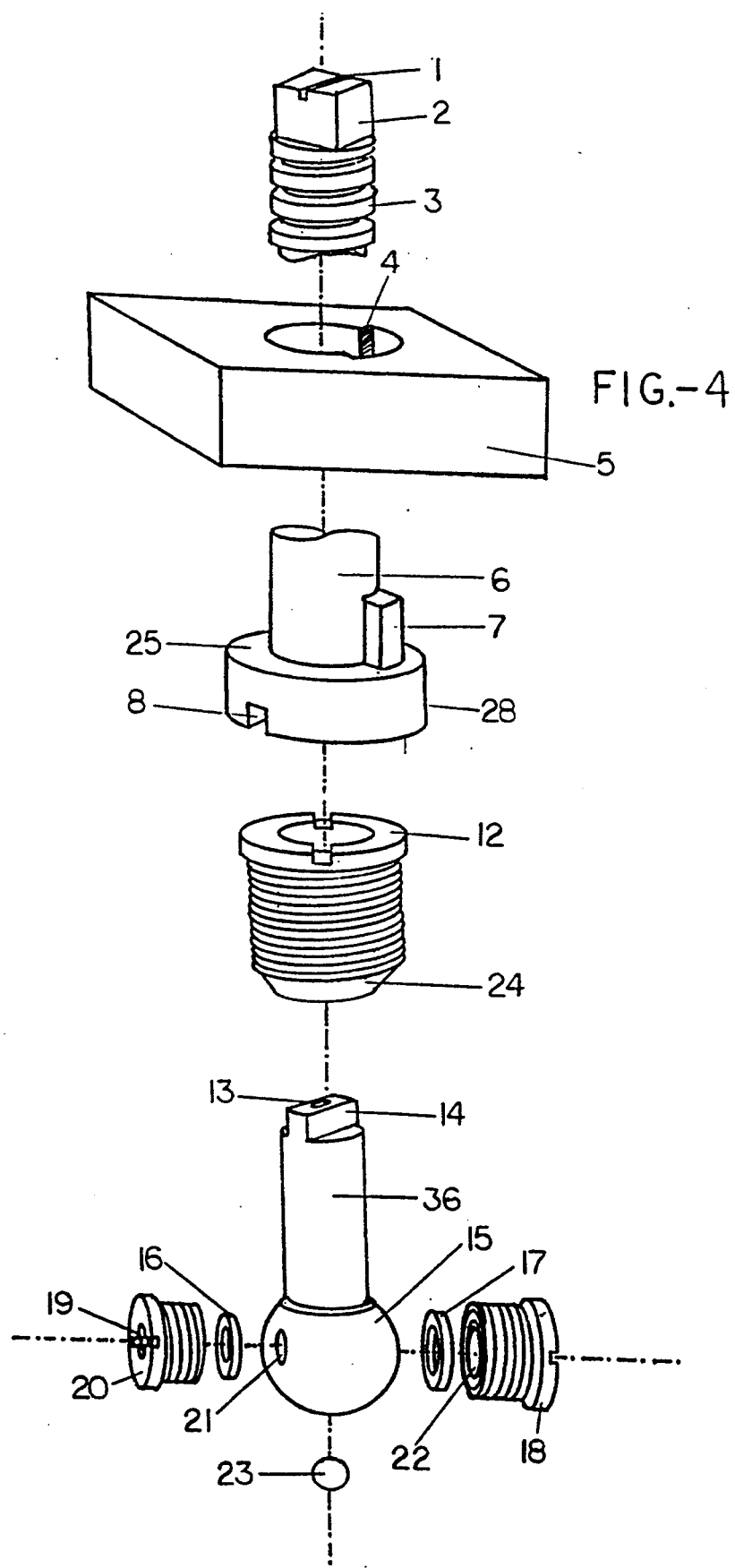

WEDGE-TYPE GATE VALVE

BACKGROUND OF THE INVENTION

1. Field of the Invention

This invention relates to gate valves. In particular, this invention relates to gate valves which have a wedge-shaped valve member which includes an internal pressure equalizing valve for use in reducing the pressure differential between the upstream and downstream sides of the wedge-shaped valve member prior to opening of the gate valve.

2. Related Art

West German Patent No. 25 46 024.6 which issued on Apr. 21, 1977, to Klaus F. Union Armat discloses two inclined discs are in place of the wedge-shaped valve member with two smaller discs in the center providing a bypass path, all discs activated by the same valve stem. In this device the discs sealing surfaces are exposed to the flowing fluids, as the pressure equalizing valves are opened, the flowing fluids erode the sealing surface and the valve may not provide positive closure. Fluid buildup in the annular space above the discs may prevent the opening of both the bypass and the valve.

A wedge shaped gate valve which incorporates a pressure equalizing valve is disclosed in U.S. Pat. No. 4,678,008 issued on Jul. 7, 1987, to Gyongyossy. In this structure, the pressure equalizing valve is in the form of a piston. When the valve stem is cracked open, the system pressure will raise the piston from the seat to permit fluid to flow from the upstream side to the downstream side of the valve. Pressure buildup in the annular space could prevent the piston-shaped equalizing valve from opening, as equal pressures acting on both sides of the valve and the gate valve.

A common problem in gate valves is the accumulation of fluids in the annular space above the gate which can lock the gate down if such fluids are not removed or allowed to escape.

It is an advantage of the present invention to provide a simple and efficient pressure equalizing valve in a wedge-shaped valve member of a gate which will open freely and effortlessly without regard to the fluid pressures in the system.

SUMMARY OF THE INVENTION

The present invention provides a wedge type gate valve in which a pressure equalizing valve is located in a chamber in the wedge-shaped valve member which is vented to the downstream side of the gate to equalize system pressure prior to opening the valve.

The vent passage which opens from the pressure equalizing valve chamber to the downstream side of the gate also permits the evacuation of all fluids from the annular space above the gate.

According to one aspect of the present invention, there is provided in a gate valve having a stem mounted in the wedge-shaped valve member for limited rotational movement of a connecting member between two stops in such a way that the stem rotational movement stops at a predetermined exact point when the sealed internal ball-shaped valve is fully opened or fully closed, thereby opening or closing the wedge-shaped member pressure equalizing passage.

The internal passage also communicates with the annular space located above the gate through a vent that opens into the passage. The internal passage at this point is enlarged to provide the capacity and velocity necessary for the added flow and to provide a venturi effect. Thus, in addition to equalizing pressure, the vent passage opening from the said annular space through the pressure equalizing valve, also vents the fluids from the annular space to the downstream side of the gate valve. The sealing surfaces of the internal ball-shaped pressure equalizing valve are not exposed to high velocity fluids, thereby retaining their integrity to provide a positive seal. Consequently, the gate is not wedged tightly into the seat or prevented from opening.

BRIEF DESCRIPTION OF THE DRAWINGS

FIG. 4 is an exploded view of an alternative configuration of the pressure equalizing components for use with larger gates.

PREFERRED EMBODIMENTS

Figure 1:
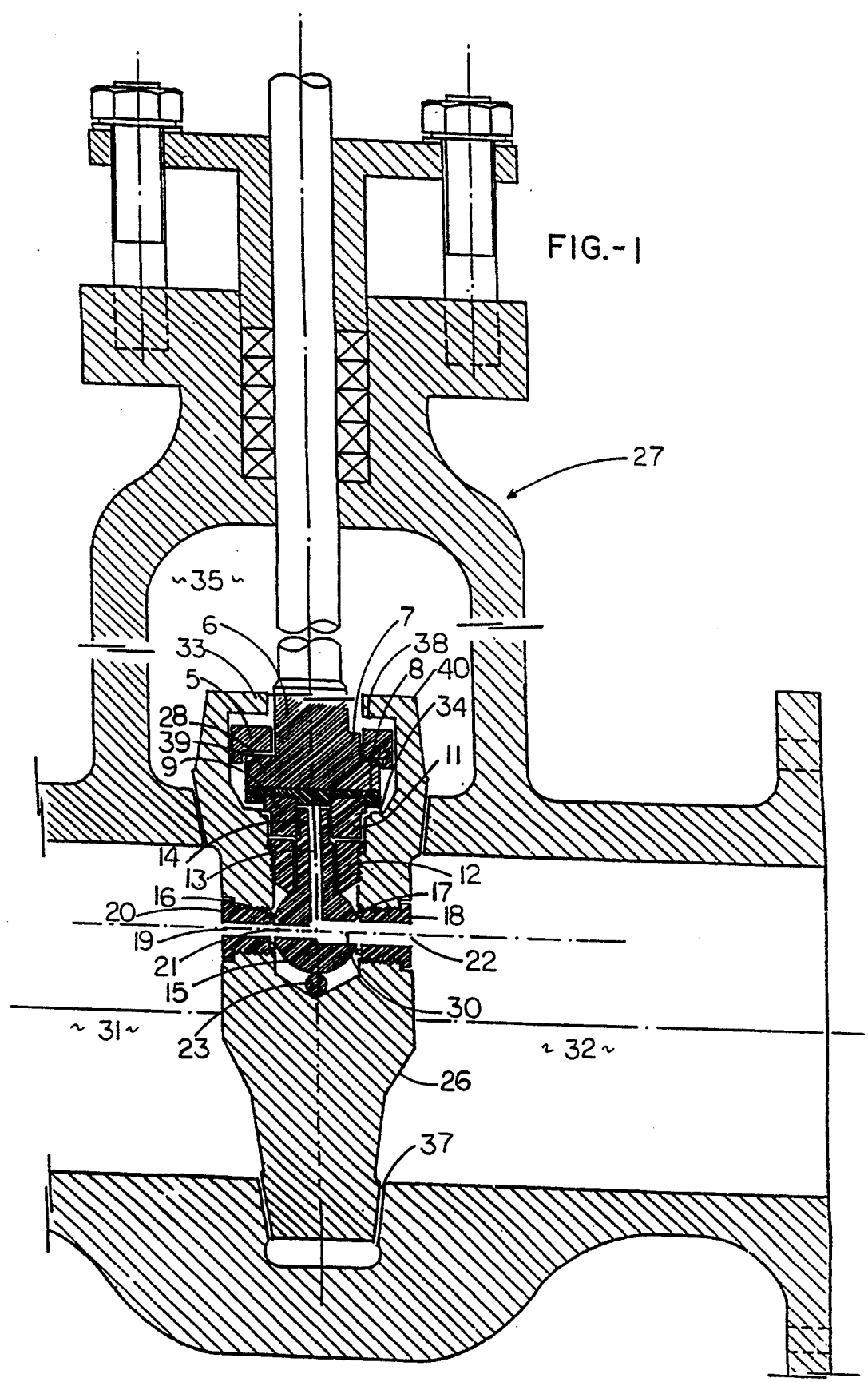
FIG. 1 is a cross-sectional side view showing the components as they are installed and the pressure equalizing valve in a fully open position.
Figure 2:
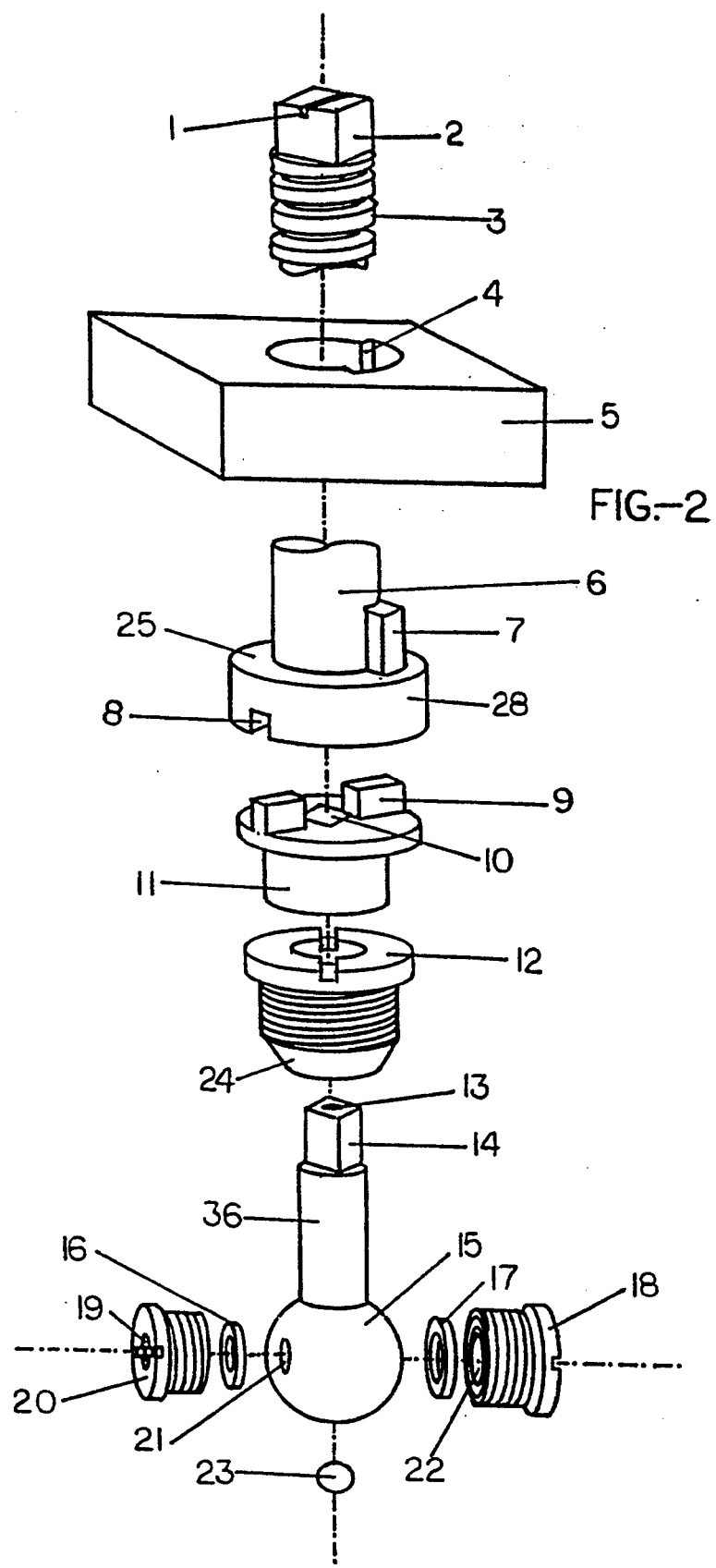
FIG. 2 is an exploded view of the pressure equalizing components in the order of installation.

With reference to FIG. 1 of the drawings, the reference numeral 27 refers generally to the gate valve constructed in accordance with an embodiment of the present invention. The valve consists of a body which has a through passage with an inlet 31 and an outlet 32 and a wedge-shaped gate 26, the gate is slidably mounted into the valve body 27 and a valve stem 6 is provided for raising or lowering the gate.

Gate valves of this general type are well known and consequently, the structural features of the valve will not be described in great detail.

The wedge-shaped valve member 26 has an upstream face directed toward the upstream section (inlet 31) and a downstream face directed toward the downstream section (outlet 32) of the valve. The wedge-shaped valve member 26 is formed with a pressure equalizing passage identified by the numbers 19 for the inlet and 22 for the outlet, this passage continues into the rotationally movable ball-shaped internal bypass valve 15, here the passage internal diameters are adjusted to provide the smaller diameter inlet 21 and larger diameter outlet 30 to accommodate an increased flow from the vent connection 13 which extends into the annular space 35 above the gate 26.

The pressure equalizing ball-shaped internal bypass valve 15 is supported by a nearly frictionless ball 23 and positioned by two adjustable, threaded distance pieces of different diameters, a smaller inlet 20, and a larger outlet 18. Both distance pieces have a small circular grove on the inside towards the ball valve for the seal rings 16 and 17, respectively. To prevent upward movement of the internal bypass valve 15, a threaded distance piece 12 is installed, the lower portion 24 of distance piece 12 is frusto-conical shaped to reduce the metal to metal contact and consequently, reduce friction. The stem 36 of the internal bypass valve 15 passes through the distance piece 12. The distal end 14 of the stem 36 is squared to accommodate a transition piece 11 which transmits the gate valve stem 6 rotational movement to the internal bypass valve 15.

The gate valve stem 6 has a T-shaped head portion 28 with a key 7 and a slot 8 for receiving the winged transition piece 11. The stem 6 is collared with a square block 5 and has a loose fitting relationship to stem 6 and to the wedge-shaped valve member 26. Approximately one-quarter of the circular dimensions of block 5 is removed to provide a keyway 4 to accommodate the increased diameter of key 7 and in turn, limit the rotation ball-shaped valve 15. The lower central portion of block 5 is recessed to form recess 39, which accommodates the head 28 and further stabilize the adjoined members. Rotation of stem 6 is transferred to the internal ball-shaped bypass valve by transition member 11.

Upon construction, the wings 9 of the transition piece 11 are aligned and loosely fitted into the slot 8 on the bottom of the T-shaped head portion 28. The stem 14 of the internal bypass valve 15 is tightly fitted into the matching center 10 of the transition member 11. As the stem 6 of the gate valve is turned between the limiting stops of block 5 the pressure equalizing bypass valve 15 will also turn the same amount, consequently, opening or closing the internal bypass. In large gate valves the transition member 11 is not necessary as illustrated by FIG. 4 where the head 14 seats directly in slot 8 of the T-shaped head 28.

Figure 3:
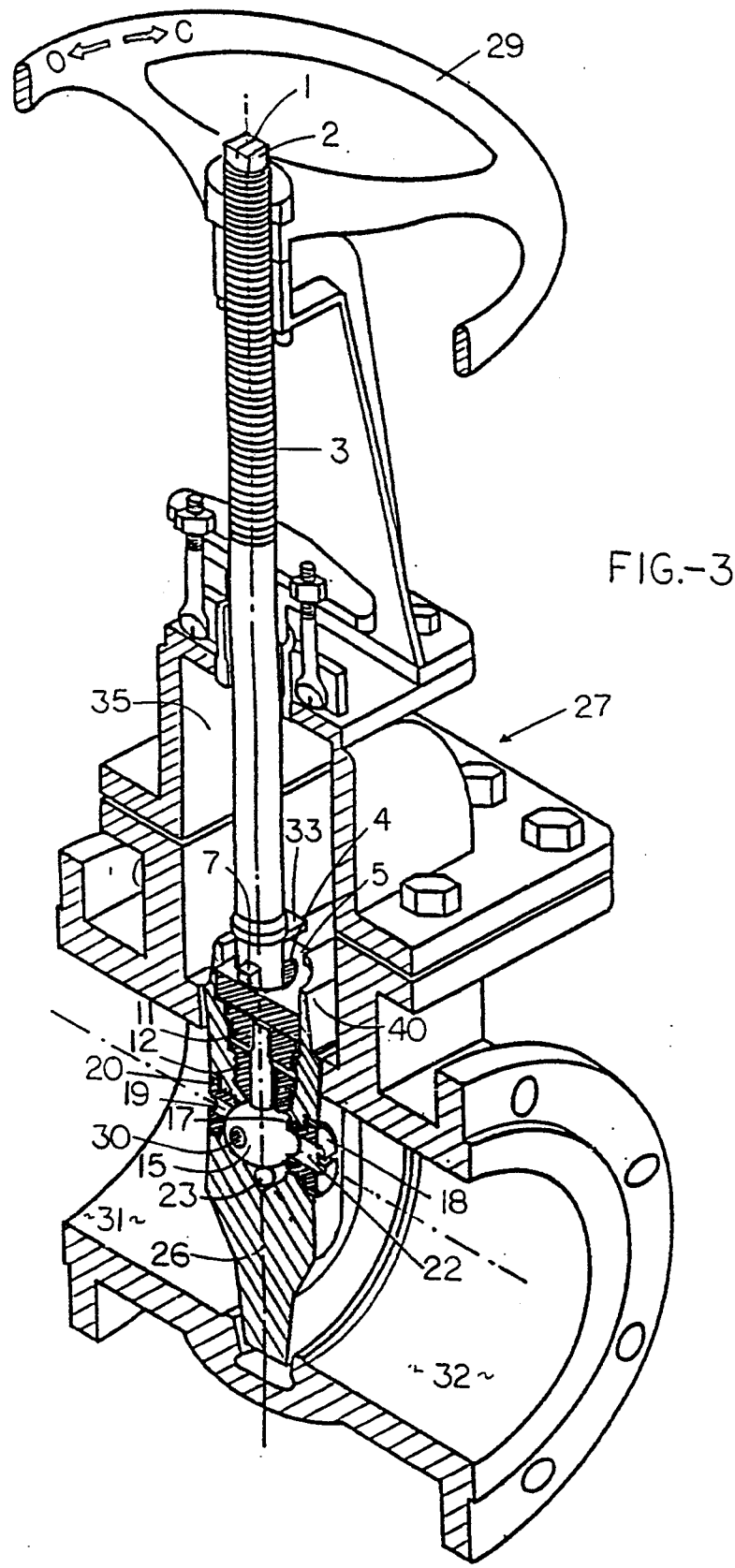
FIG. 3 is a sectioned isometric view of the gate valve constructed in accordance with an embodiment of the present invention showing the pressure equalizing valve in the closed position.

In use, when the wedge-shaped valve member 26 and the internal bypass valve 15 are closed as illustrated in FIG. 3, the valve stops all fluid flow.

Depending on the application, the pressure differential of the fluids could be substantial between the upstream 31 and the downstream side 32 of gate 26. Opening the valve under this condition is extremely difficult and may cause serious damage to the valve sealing surfaces and the valve stem. To prevent this from occurring, prior to opening the gate, fluid pressure between the upstream 31 and downstream 32 sides must be equalized. Opening the gate valve illustrated in FIG. 3 makes this task relatively easy, in addition, will greatly prolong the useful life of the valve.

With reference to the drawings, the valve is to be operated in the following sequence. In a closed valve, head 28 of stem 6 forces the wedge-shaped valve member 26 into the seat 37 to keep the valve closed. By turning hand wheel 29 counterclockwise, the stem 6 will rise and consequently, reduce tension on the said head and stem. The head 28 will separate from the shoulder 34 of the wedge-shaped valve member 26 and move upward with the block 5 until all the built-in slack is taken out of the system. This slack is necessary to permit minor misalignment of all components including gate 26. The head 28 upward movement is stopped by the collared block 5 which becomes wedged between the upper portion 25 of the T-shaped head 28 and the shoulder 33 of valve member 26.

Fluid accumulated in the annular space 35 above wedge-shaped valve member 26 and the fluid pressure on the upstream side 31 may force the wedge-shaped valve member 26 to remain tight in its seat until the forces are equalized. The invention keeps friction causing surfaces such as sealing rings 16 and 17 of the internal bypass valve 15 and the activating components to a minimum and close to the vertical axis of the valve. Consequently, turning hand wheel 29 in a counterclockwise direction instead of opening the wedge-shaped valve member 26, will turn valve stem 6.

Rotation of stem 6 is stopped when key 7 reaches the end of keyway 4 of the collar 5. This limited rotation is transmitted by transition member 11 to the internal bypass valve 15 and forces it to make the same limited turn. As bypass valve 15 rotates on its axis, inlet 21 and outlet 30 ports of the passage of this highly polished ball move past their respective seal rings and becomes aligned with passages 19 and 22 of the wedge-shaped gate 26, permitting the flow of the equalizing fluids. Opening the internal bypass valve also opens vent 13 from the annular space to evacuate all accumulated fluids.

Valve stem 6 rotation can be verified by notch 1 on top of the threaded portion of the stem indicating the internal passage valve position, or assisted by using a simple common tool (not shown) on the squared portion 2 provided for this purpose. Pressure equalized, the wedge-shaped valve member 26 can now easily retract into the annular space, thereby opening the valve by continued rotation of the stem 6 on threads 3 which is transmitter through block 5 on to gate members 40 and 33.

Closing the valve is accomplished in the normal fashion by rotating the hand wheel clockwise, the head of the stem 28 will force the wedge-shaped valve member 26 into the seat 37 by exerting pressure on shoulder 34. The bypass valve 15 is held in position by friction of the ball with the seals. In normal operation the bypass will remain open or partially open until the valve member becomes tightly wedged in its seat. The stem will turn to close the internal bypass valve 15 when the rotational pressure overcomes the friction. When the bypass is open during the gate valve closing, fluids trapped in annular space 35 will aspirated out by the venturi effect of the fluid flowing through inlet 19 and outlet 22.

The invention claimed is:

1. In a gate valve having a wedge-shaped valve member, a vertically movable, rotatable stem operably associated with the wedge-shaped valve member, an annular space above the wedge-shaped valve member to receive said wedge-shaped valve member therein, said wedge-shaped valve member having a pressure equalizing passage opening therethrough which communicates between the upstream and downstream sides thereof, wherein the improvement comprises:

a pressure equalizing ball-shaped valve located in a chamber formed in said wedge-shaped valve member which is arranged to communicate with said through passage, said pressure equalizing ball-shaped valve having an internal passage communicating through a connecting vertical passage to the annular space above the wedge-shaped valve member to evacuate any accumulated fluids upon opening and permit withdrawal of the said wedge-shaped member into said annular space and said equalizing ball-shaped valve being rotationally movable toward and away from the said pressure equalizing passage to open or close the wedge-shaped valve member pressure equalizing passage, said pressure equalizing ball-shaped valve being movable in limited rotational movement between two stop positions, whereupon opening the flowing fluid will not come into direct contact with the sealing surfaces of the internal ball-shaped valve to cause erosion of the sealing surfaces of the said valve.

2. The gate valve of claim 1 wherein said pressure equalizing passage through the wedge-shaped valve member is straight.

3. The gate valve of claim 2 wherein said pressure equalizing passage through the wedge-shaped valve member comprises a smaller diameter bore on the upstream side and a larger diameter bore on the downstream side.

4. The gate valve of claim 3 wherein said internal ball-shaped valve is located in a longitudinally elongated chamber and positioned by threadably adjustable distance pieces that also house the replaceable valve seals installed to provide positive closure.

5. The gate valve of claim 4 wherein said internal ball-shaped valve is operably connected to said vertically moveable, rotatable stem for the same but limited rotational movement as that applied to withdraw or lower the gate into or from the annular space.

6. The gate valve of claim 5 wherein the stem comprises a key rotatable in an arc-shaped keyway to limit the stem rotation between two stops fabricated at either end of said keyway in a matching member.

7. The gate valve of claim 6 wherein said stem comprises a head portion notched to provide a seat for an extension of a distance piece that transmits the stem rotational movement to the internal ball-shaped equalizing valve.

8. The gate valve of claim 1 wherein said pressure equalizing passage through the wedge-shaped valve member comprises a smaller diameter bore on the upstream side and a larger diameter bore on the downstream side.

9. The gate valve of claim 1 wherein said internal ball-shaped valve is located in a longitudinally elongated chamber and positioned by threadably adjustable distance pieces that also house the replaceable valve seals installed to provide positive closure.

10. The gate valve of claim 1 wherein said internal ball-shaped valve is operably connected to said vertically movable, rotatable stem for the same but limited rotational movement as that applied to withdraw or lower the gate into or from the annular space.

11. The gate valve of claim 10 wherein the stem comprises a key rotatable in an arc-shaped keyway to limit the stem rotation between two stops fabricated at either end of said keyway in a matching member.

12. The gate valve of claim 11 wherein said stem comprises a head portion notched to provide a seat for an extension of a distance piece that transmits the stem rotational movement to the internal ball-shaped equalizing valve.

* * * * *